United States Patent [19]

Berteau

[11] Patent Number: 5,602,991
[45] Date of Patent: *Feb. 11, 1997

[54] SYSTEM FOR MANAGING SYSTEM FOR MANAGING NETWORKED COMPUTER APPLICATIONS

[75] Inventor: C. Donald Berteau, Sebastian, Fla.

[73] Assignee: GeoNet Limited, L.P., Vero Beach, Fla.

[ * ] Notice: The term of this patent shall not extend beyond the expiration date of Pat. No. 5,423,003.

[21] Appl. No.: 451,069

[22] Filed: May 25, 1995

Related U.S. Application Data

[63] Continuation of Ser. No. 205,090, Mar. 3, 1994, Pat. No. 5,423,003.
[51] Int. Cl.⁶ ................................................. H04M 15/00
[52] U.S. Cl. ................................................. 395/200.01
[58] Field of Search ....................... 395/200.01, 200.1, 395/200.13

[56] References Cited

U.S. PATENT DOCUMENTS

| | | | |
|---|---|---|---|
| 4,949,248 | 8/1990 | Caro | 395/200.09 |
| 4,979,118 | 12/1990 | Kheradpir . | |
| 5,021,949 | 6/1991 | Morten et al. . | |
| 5,073,890 | 12/1991 | Danielsen . | |
| 5,142,624 | 8/1992 | Patrick II | 395/200.01 |
| 5,237,561 | 8/1993 | Pyhälammi | 370/29 |
| 5,259,026 | 11/1993 | Johnson . | |
| 5,282,244 | 1/1994 | Fuller et al. . | |
| 5,528,677 | 6/1996 | Butler et al. | 379/196 |

FOREIGN PATENT DOCUMENTS

| | | |
|---|---|---|
| 035408 | 3/1990 | European Pat. Off. . |

OTHER PUBLICATIONS

Knowledge–Driven Distributed Information System by Papazoglous, 1990 IEEE, pp. 671–679.

Knowledge Based Architecture to Integrate Heterogeneous Distributed Information Systems, 1990 IEEE, pp. 682–689, Bernus et al.

Federal Communications Commission (FCC), Supplementary Comments filed by BellSouth dated Jul. 7, 1993 under CC Dkt. 91–346.

(List continued on next page.)

*Primary Examiner*—William M. Treat
*Assistant Examiner*—Patrice L. Winder
*Attorney, Agent, or Firm*—Jones, Tullar & Cooper, P.C.

[57] ABSTRACT

A system for managing distributed information system applications employs an Advanced Intelligent Network (AIN) telecommunications network based upon the industry standard, Signalling System 7 (SS7). SS7 employs intelligent, computer based service control points which cause interconnections to be made among switching nodes in the network to facilitate communications between the various nodes. In the system of the present invention, a plurality of information storage, retrieval and/or management devices, such as applications computers, are selectively interconnected with one another via the telecommunications network. In order to more efficiently manage these interconnections, an applications manager computer is interfaced to one of the service control points and controls which interconnections are to be made by the service control point. The applications manager computer employs data on the particular application, routing algorithms and transmission link speed data to determine the best scheme for interconnecting the applications computers and then instructs the service control point to make the necessary connections and transmit the necessary commands to implement the particular application. The system has a wide range of information applications, such as database management, process monitoring and control, information services management, reservations system management, publishing and distribution systems for movies, video or audio.

17 Claims, 3 Drawing Sheets

OTHER PUBLICATIONS

Bernstein et al., Philip A., "Query Processing in a System for Distributed Databases (SDD-1)", ACM Transactions on Database System, vol. 6, No. 4, Sep. 1981, pp. 602–625.

Apers, Peter M. G., "Data Allocation in Distributed Database Systems", ACM Transactions on Database Systems, vol. 13, No. 3, Sep. 1988, pp. 267–304.

Geonet Limited, L. P., International Search Report, PCT/US95/01387, dated Jun. 28, 1995, 4 pgs.

Gerner, Nina, "Intelligenztest erfolgreich bestanden", Telcom Report (Siemens) 16 (1993) Jul./Aug., No. 4, Munchen, DE, pp. 204–207.

Desai, Samir S., "using Object–Oriented Distributed Technologies in Operations Systems", Annual Review of Communications, 1993–94, pp. 818–825.

Graetz, Ingeborg et al., "IN and CSTA –two sides of the same coin?", International Switching Symposium, vol. 2, Oct. 1992, pp. 33–38.

Kato, Toshihiko, et al., "Applying Distributed Processing Technologies of of Intelligent Network", IEICE Transactions, vol. E74, No. 11, Nov. 1991, pp. 3672–3680.

Sinnadurai, F. N. et al., "Service Management Systems", British Telecommunications Engineering, vol. 10, Oct. 1991, pp. 180–186.

Knowledge–Driven Distributed Information Systems by Papazoglous, 1990, IEEE Publication pp. 671–679.

Knowledge Based Architecture to Integrate Distributed Information Systems, IEEE 1990 Publication, pp. 682–689, Bernus et al.

SYSTEM FOR MANAGING SYSTEM FOR MANAGING NETWORKED COMPUTER APPLICATIONS

This is a continuation of application Ser. No. 08/205,090 filed on Mar. 3, 1994, now U.S. Pat. No. 5,423,003.

BACKGROUND OF THE INVENTION

1. Field of the Invention

The present invention relates in general to a system for managing distributed information system applications, such as networked computer applications, in which an application manager computer interfaces logically to a service control point of a telecommunications network.

2. Background and Description of the Prior Art

The Telecommunications Infrastructure:

The global telecommunications infrastructure is evolving into an "Advanced Intelligent Network" (AIN). Such a network will be much more than a matrix of switches to provide end to end connection. The network will provide network management functions, computer data translation from one computer protocol to another, and many other enhanced services.

Three characteristics of the telecommunications network infrastructure which are significant developments for data networks are:

a. the deployment of packet switching systems for data movement, b. The implementation of a separate signalling network using data packets, and c. The incorporation of computer databases into the signalling network for network control functions, such as routing phone calls.

An important characteristic of the modern telecommunications infrastructure is the use of "out-of-band" signalling as described in the industry standard, Common Channel Signalling System Number 7 (CCSS7 or just SS7). Instead of using a portion of the bandwidth of a communication channel for signalling (e.g. dialing a phone number), the signalling information (e.g. dialed digits) is sent over a separate channel (part of a signalling network) as "packets" of digital information. These packets are processed by computer systems which are part of the telecommunications network infrastructure. For example, to make a call, the calling party causes a "call-setup packet" to be transmitted to a computer which is part of the SS7 network structure. This computer, using a database of information and the signalling network, determines whether the connection can be made to the called party and, if so, causes the end-to-end communication line to be established.

Another important characteristic of the modern telecommunications infrastructure is the provision of "bandwidth-on-demand". For example, using Integrated Services Digital Network (ISDN) services, multiple individual communications channels may be combined to provide one high speed communications channel and then the high speed channel may be separated back into multiple individual communications channels again. Thus, the "bandwidth-on-demand" provides the additional data transmission capacity only for the duration of time when needed.

Distributed Information System Applications:

Meanwhile, the computer industry is evolving into a network of computers, large and small, which need to constantly exchange information and share resources. These networks of computers are often distributed over many locations, encompassing a large geographical area, even including worldwide network interconnection.

An application is defined as a "distributed application" if it is distributed over two or more computer sites connected by a communication network and if it has both a "global application" and autonomous local applications operating independently at two or more of the individual sites. A global application is one which requires accessing data at more than one site.

In the prior art, the coordination and management of global applications over such networks is done by computers which are logically "outside of" the telecommunications network infrastructure, that is the computers which are programmed to coordinate and manage the global applications are not closely integrated into the telecommunications network. This lack of close integration of global applications and the telecommunications network results in a system architecture which is not cost effective because it does not take maximum advantage of telecommunications network resources to minimize the cost of information movement. A need therefore exists for the coordination and management functions of distributed information system applications to be closely integrated into the telecommunications network in order to minimize the cost of information movement across the telecommunication network. Additionally, such close integration would facilitate more robust alternate routing procedures to enable more reliable interconnection management.

SUMMARY OF THE INVENTION

An object of this invention is to provide more effective and efficient management of the interconnection and data exchange in a distributed information system application through the use of the more robust network access, management and control capabilities of the Common Channel Signalling System Number 7.

Another object of this invention is to make use of the present and future capabilities of CCSS7 for call control, remote control, network database access and management and maintenance to provide more reliable interconnection management of distributed information system applications.

A further object of this invention is to make use of such present and future capabilities of CCSS7 to accomplish more cost effective movement of information between the networked computer systems.

In summary, the present invention is a system for managing a distributed information system application which integrates an application manager device for each global application into the telecommunications network, thereby providing a solution to the need for coordination and management of networked computer applications. The application manager device may be a computer system with specific hardware, software, and interfaces or may be special software added to the telecommunications network computers, depending upon the application.

The telecommunications network is adapted to include an interface for the application manager which provides access to the network for issuing queries, commands and messages for coordination and control of the network connections and application processes. The telecommunications network is further adapted to route certain transactions to the application manager for processing.

In the preferred embodiment of the present invention, the application manager computer system is logically connected through the interface directly to an SS7 service control point.

This arrangement enables the application manager computer to communicate directly with the service control point and command it to interconnect the various information storage, retrieval and/or management devices, such as computers, in the distributed information system application in the most efficient manner, both from speed and connection standpoints. To accomplish this, the application manager computer is programmed with information for each application concerning the location and database content of each computer or information management device in the application, and the speed, types and alternate routing information for the communication links which are available for connecting the various computers in the application. With this information, the application manager computer determines the most efficient connection scheme for the particular networked application and instructs the service control point directly to make the necessary connections.

This system design provides for more cost effective management of the movement of information across the network by enabling effective use of "bandwidth-on-demand" and by eliminating unnecessary connections. The system design enables more reliable interconnection management because the application can include alternate routing algorithms. This system design would be employed to satisfy the needs of a wide range of information applications, such as database management, process monitoring and control, information services management, reservations system management, publishing, and distribution systems for movies, video, or audio.

BRIEF DESCRIPTION OF THE DRAWINGS

The foregoing and additional objects, features and advantages of the present invention will become apparent from the following detailed description of a preferred embodiment thereof, taken in conjunction with the accompanying drawings in which.

DETAILED DESCRIPTION OF THE PREFERRED EMBODIMENT

Figure 1:
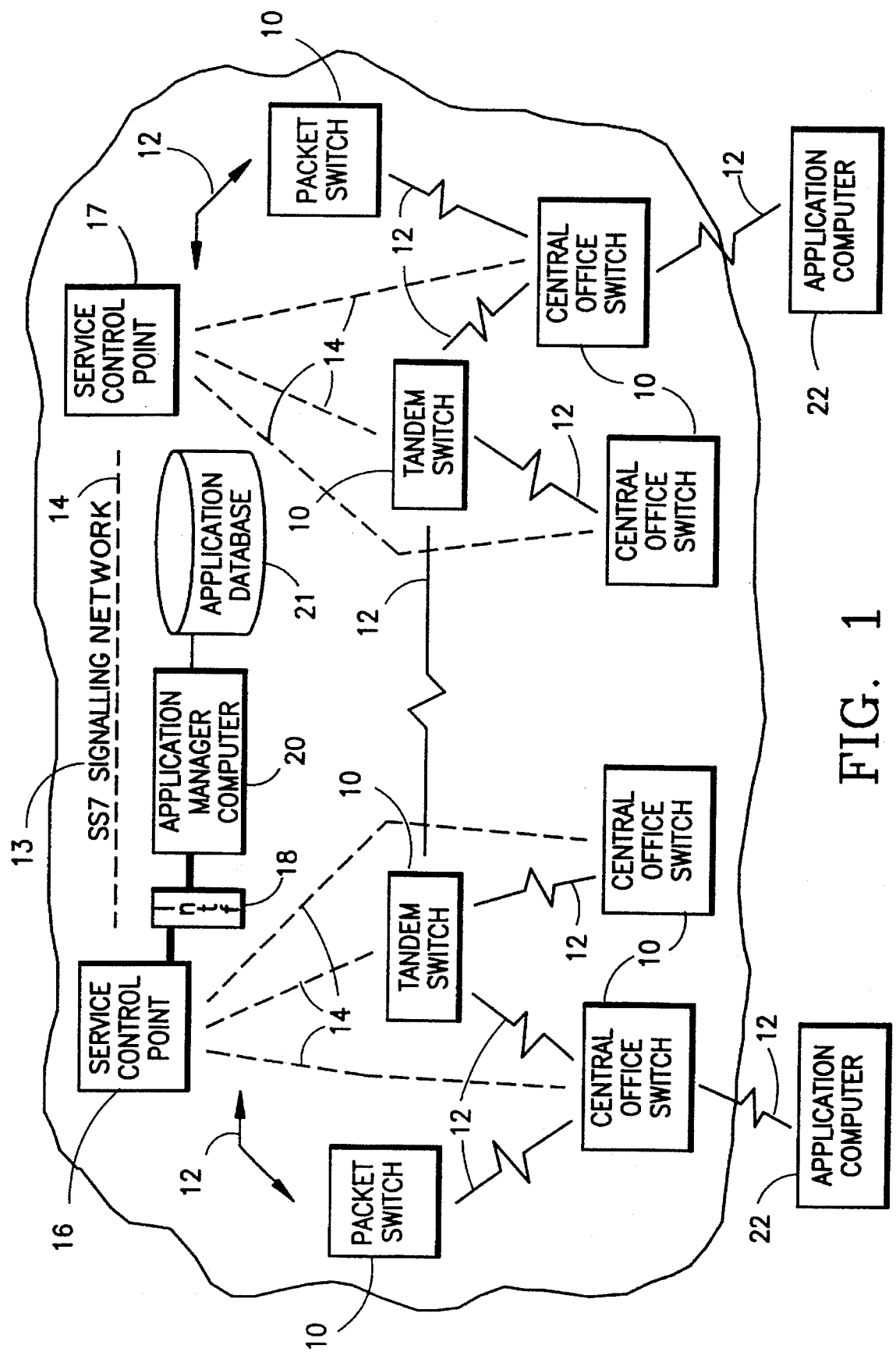
FIG. 1 is a block diagram of the system architecture for a telecommunications system constructed in accordance with the preferred embodiment of the present invention.

Turning now to a more detailed consideration of a preferred embodiment of the present invention, FIG. 1 shows a block diagram of the system architecture for a telecommunications system adapted for the invention. The telecommunications network architecture is composed of a number of conventional switching and process nodes 10, which as illustrated include packet switches, central office switches and tandem switches. All of the nodes 10 are interconnected by a network of transmission links 12 and a conventional SS7 signalling network 13 is employed to control these interconnections. The SS7 signalling network 13 includes a plurality of signalling links 14 and a plurality of service control points 16 and 17. The signalling links 14 connect each of the switching nodes 10 to one of the service control points 16 or 17, as well as the service control points 16 and 17 to each other.

The service control points 16 and 17 are computer based elements which perform the usual SS7 network control functions. For telephone calls where the called party is located on a node outside of the node where the calling party is located, or where special calling codes, such as 800 or 900 calls, are used, service control points are used to determine and establish the routing between the endpoints. Each service control point has a computer system including a database containing the information necessary to determine the transmission links which can provide a path between the two parties. The determining and establishing of transmission links between the calling and called parties is accomplished by signalling messages sent between the switch nodes and service control points and between service control points. A detailed description of the SS7 signalling protocols and message formats is given in standards documents published by the Consultative Committee on International Telephone and Telegraphy (CCITT) and by the American National Standards Institute.

A very important element of the system architecture of the present invention is the attachment of an application manager device, such as a computer 20 and associated application database 21 to the service control point 16, using a communications interface 18; making the application manager computer 20 logically attached directly to the computer system in the service control point 16. The application manager program software is thereby integrated with the SS7 network control software programs to provide the capability for the exchange of queries, messages and commands necessary to establish interconnection of network transmission links. The preferred embodiment of the interface 18 is an ISDN interface and special switch node software with ISDN to SS7 interworking which provides a logical connection to the service control point 16 and full access to all SS7 networking capabilities. The particular configuration of the interface 18 depends of course on the configuration of the telecommunications network to which it is connected. Fundamentally, however, the interface 18 is like any other conventional interface for connecting two communications devices. These interfaces are already being implemented to allow open access to third parties to the Advanced Intelligent Network now being implemented by the telecommunications industry. An example of such an interface is described in the FCC Supplementary Comments filing by BellSouth dated Jul. 7, 1993 under CC Docket No. 91-346.

Alternatively, the interface 18, application manager computer 20 and application database 21 can be an integral part of the computer system and associated software in the service control point 16. In this case, the interface 18 is actually a software interface contained within the control point's software, and the application manager computer 20 is a separate software module in the service control point computer system.

The application manager computer 20 therefore receives and transmits messages related to the networked computer application through the service control point 16. These messages allow the application manager computer 20, in conjunction with the inherent capabilities of the service control point 16, to establish network interconnections between a plurality of distributed information storage, retrieval and/or management devices, such as application computers 22, that are each connected to separate ones of the switching nodes 10 in the telecommunications network. The application manager computer 20 also sends queries and commands through the service control point 16 to each of the application computers 22 to control the application processes. In this manner, the telecommunications network, through the service control point 16, identifies messages which are addressed to the application manager computer 20 and executes signalling commands issued by the application manager computer 20.

The application manager database 21 contains data structures and data elements from the following sets:

a. data elements, data structures and data directories which are part of the application;

b. a master data directory containing the information which describe the distribution of the database structure and elements; and, c. a routing directory containing the information which describes location and path information for each of the distributed database locations.

The application manager computer 20 distributes data updates and responds to information requests, directing the movement of data to effect the updates and responses. It also selectively invokes program processes in the application computers 22 to coordinate and control the application. Two groups of software elements included in the application manager provide the capability to coordinate and control the application. These software elements are the programs and data related to the application processes and data structures, and the programs and data related to the telecommunications network signalling procedures and routing paths.

Figure 2:
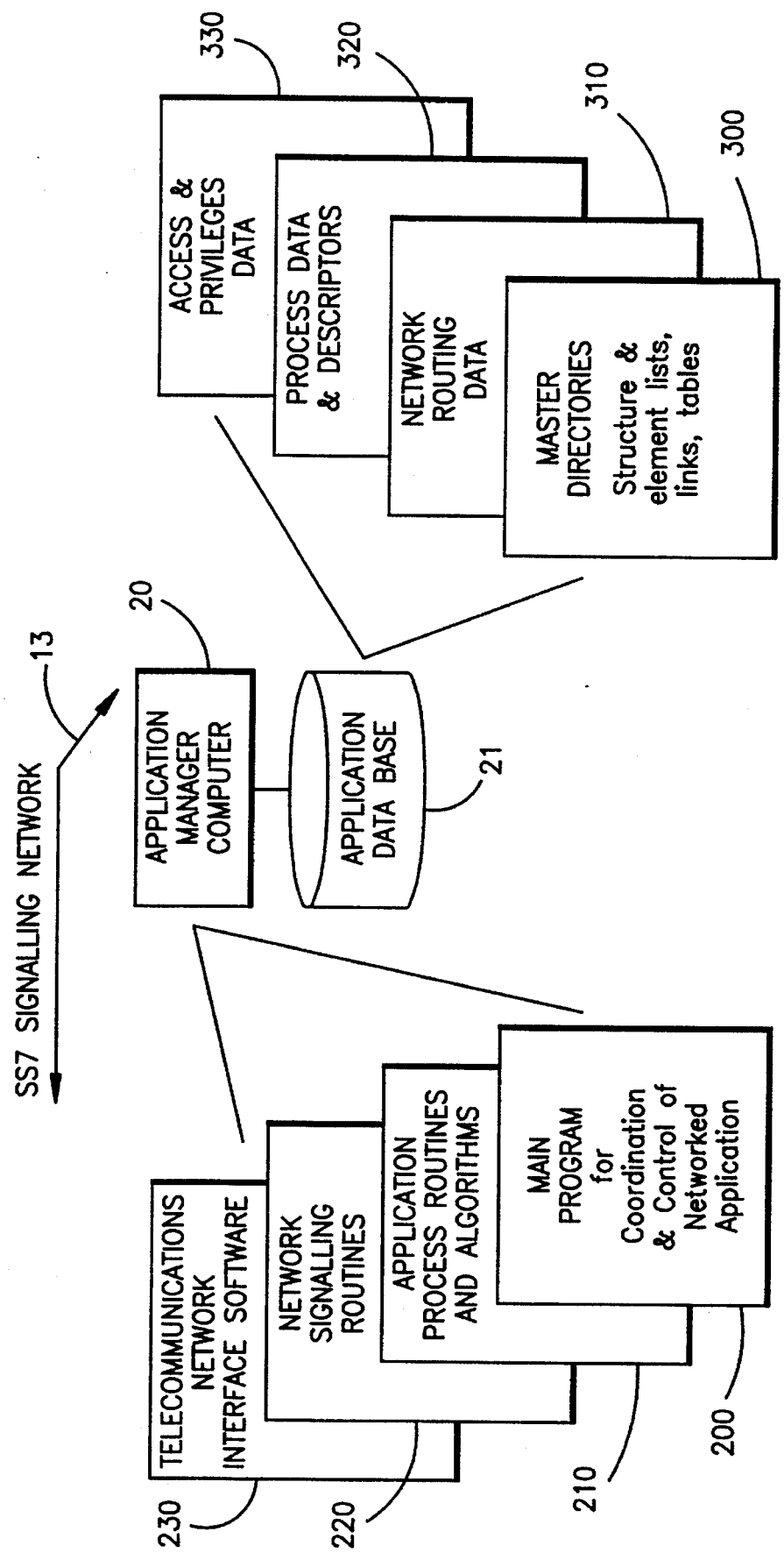
FIG. 2 is a graphical illustration of the software programs executed by the application; and, FIG. 3 is a block diagram of an example of how the system of FIG. 1 can be employed to manage a networked computer application.

Referring to FIG. 2, the application manager computer 20 executes software programs which include a main program 200 for coordination and control of the networked application, process routines 210 related to the application, network signalling routines 220 and telecommunications network software interface routines 230.

The main program 200 implements the primary functions of managing queries and managing update transactions. The process routines 210 include the software program modules which implement algorithms for optimization of the query processing, including selection of the assembly site and determination of the data transmission speed of each network connection used to move data from one network node to another. The network signalling routines 220 include the software program modules which construct, send, receive, and interpret messages to and from the telecommunications network. The telecommunications network software routines 230 include the software program modules which include the device driver for the specific network interface 18 permitted by the network owner, and which adapt the format of the messages to the format and protocol of the specific network interface 18.

The application data base 21 contains datastructures including master directories 300 for processes and data, datasets which include network routing data 310, and access rules and privileges data 330. For certain applications, the application database may also include process data and descriptors 320. Although FIG. 2 shows the application database 21 as a physical data storage device directly attached to the application manager computer 20, the database may be any suitable data storage media which is logically connected to the application manager computer 20.

The master directories for processes include tables of data describing the processes located at each node, while the master directories for data include tables of data describing the data elements located at each node. Network routing data tables include data from which the distance, costs, and available speeds of connections between nodes may be computed. Process data and descriptors includes the data necessary to describe physical processes which may be part of the application. Finally, access rules and privileges data tables provide the data which the application manager software programs use to determine whether a particular query from a particular user will be processed or access will be denied.

Figure 3:
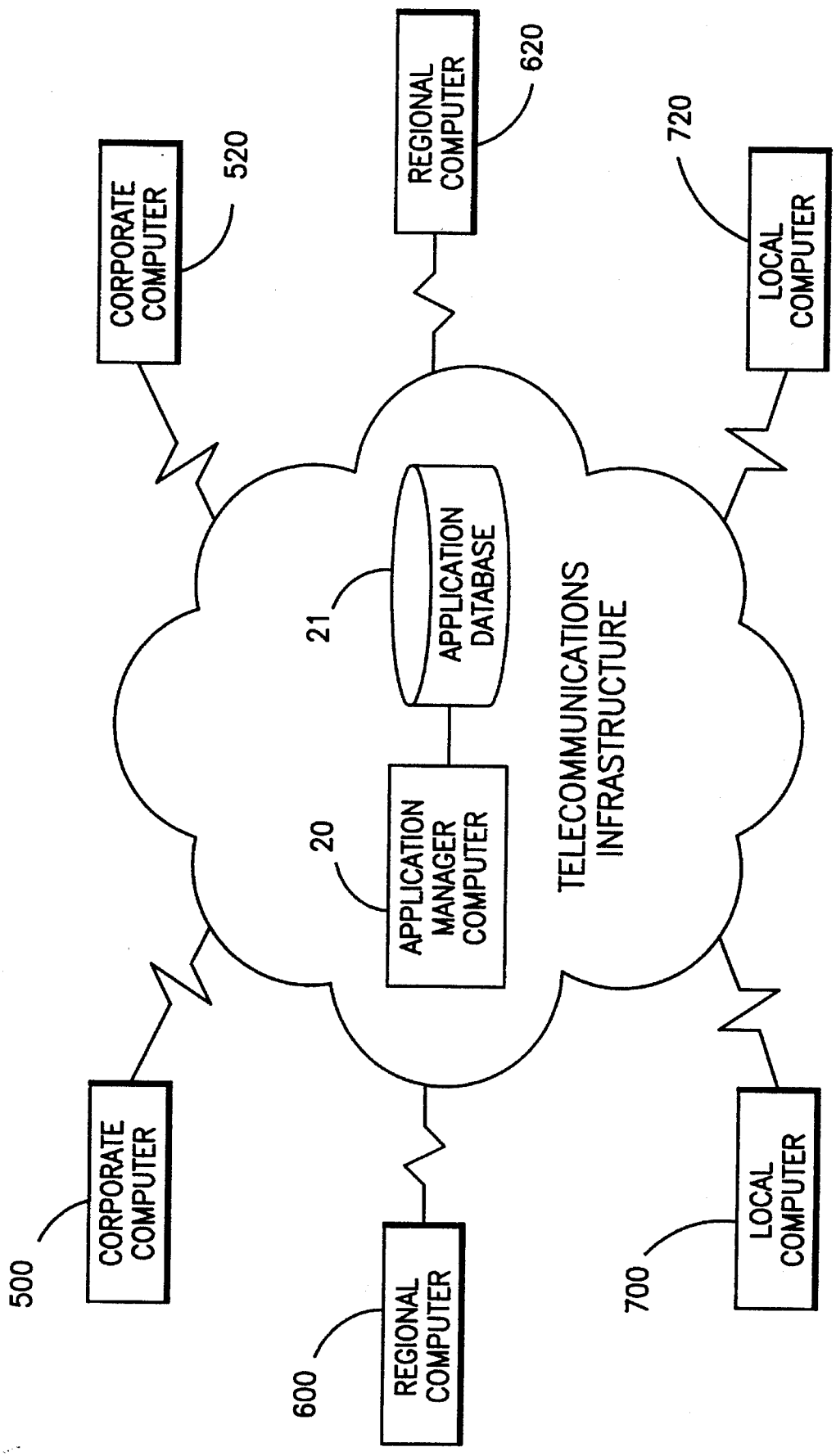

An example of an application which could advantageously be designed with the above system architecture principles would be a distributed database application for a business enterprise consisting of a network of database computers. FIG. 3 describes such an application.

For purposes of illustration, FIG. 3 includes two corporate headquarters computer facilities 500, 520, two regional office computer facilities 600, 620, and two local branch office facilities 700, 720. The two corporate computers, 500 and 520, are located in Los Angeles and New York, respectively, and the first regional computer 600 is located in Chicago. These three all have 64K BPS (64,000 bits per second) and 384K BPS, as well as "low speed" 4,800 BPS and 9600 BPS, data transmission capability. The second regional computer 620 is located in Atlanta and has 64K BPS capability. The local computers 700 and 720 are located in New Orleans and St. Louis, respectively, and have 4,800 and 9,600 bits per second capability, respectively.

The application manager computer 20 has been interfaced to the telecommunications network. As discussed previously in conjunction with FIGS. 1 and 2, the application manager computer 20 can, through use of the inherent capabilities of the signal control point 16, receive messages, send network interconnection messages, queries and commands, and can send messages and commands to the application computers 500, 520, 600, 620, 700, 720.

The "file allocation problems" of how to allocate data elements among the distributed database sites is not a part of the present invention. Much is known in the art concerning data allocation in distributed databases, and it is assumed in this example that the distributed database design has properly included data allocation considerations.

In the operation of the example illustrated in FIG. 3, an end user at the local computer site 700 enters a query which requires data elements from different computer sites for the query response to be satisfied. The language used to construct queries is not a part of the present invention. For ease of understanding by persons not trained in the art of database query programming, the example query is given in simple English language: "Print a list of all sales orders, including the order number, amount, and ship date, where the order total amount exceeded $100,000.00 and ship data was in year 1992 and the order included product number B4010BR, and the sales person was employee number 10132."

The local computer transmits the query as a network message whose destination is identified by the network as the application manager computer 20. That message, containing the query, is delivered over the network through the signal control point 16 to the application manager computer 20, which verifies that the end user has security privileges for the query and that the query answer can be constructed within the constraints of the application. If the verification produces a negative result, the appropriate response message denying the query is sent by the application computer 20 to the local computer 700 for delivery to the end user who entered the query. In that case no transmission link connections are made, saving unnecessary network usage.

If the verification produces a positive result, then the process continues as follows. The application manager computer 20 determines that the data elements required to satisfy the query response are distributed between the local computer 720 site, the corporate computer 520 site and the regional computer 620 site. In this example, the data elements giving the order total amount are located at the corporate computer 520 site, the data elements relating to the product number B4010BR and ship date are located at the regional computer 620 site, and the data elements relating to salesperson number 10132 are located at the local computer 720 site.

The application manager computer 20 maps the query into a form, called an envelope, that specifies a superset of the database that contains the data necessary to answer the original query. The application manager computer 20 translates the envelope into a reducer which consists of semijoin operations which can be executed in parallel at the three computer 520, 620, 720 sites, using an algorithm designed to minimize the cost of intersite data movement, and determining the site at which the data resulting from the reduction operations would be assembled. The result, of course, also reduces the use of network resources, making more efficient use of the network.

The application manager computer 20 sends messages which contain each of the three reduction operations to the respective computer 520, 620, 720 sites for parallel execution. After the reduction operations are completed, each of the three application computers 520, 620, 720 sends a notice of completion message to the application manager computer 20. The techniques used by the application manager to determine where all of the data elements are located and to determine the assembly site, as well as algorithms to compute the reduction operations, are well known in the art. One such implementation of these techniques is illustrated in the publication, "Query Processing in a System for Distributed Databases (SDD-1)" by Philip A. Bernstein et al., ACM Transactions on Database Systems, December 1981. For the example query, the assembly site is the regional computer 620 site.

The network control signalling messages sent by the application manager computer 20 result in corporate computer 520 being connected to regional computer 620, using a 384K BPS connection, and local computer 720 being connected to regional computer 620, using a 9,600 BPS connection. The application manager computer 20 then sends messages to computers 520, 620, 720 indicating connections have been made and requesting transmission of the data resulting from the reduction operations to the assembly site, regional computer 620. The data from corporate computer 520 is transmitted to regional computer 620 and the data from local computer 720 is transmitted to regional computer 620. When the data transmissions are completed, regional computer 620 sends a completion acknowledgement message to the application manager computer 20. The application manager computer 20 sends network control signalling messages which cause the connections between corporate computer 520 and regional computer 620 and between local computer 720 and regional computer 620 to be disconnected.

The application manager computer 20 sends a message to regional computer 620 requesting regional computer 620 to execute the query, using the superset of the database assembled at regional computer 620. Regional computer 620 executes the query and sends a message to the application manager computer 20 confirming that the query answer is computed.

The application manager computer 20 sends network control signalling messages which cause local computer 700 to be connected to regional computer 620, using a 4,800 BPS connection, and then sends a message to regional computer 620 requesting that the query answer be transmitted to local computer 700, where the query originated. The query answer is made available to the end user who entered the query. Local computer 700 sends a message to the application computer 20 confirming that the query answer has been received. The application manager computer 20 then sends network control signalling messages which cause the connection between local computer 20 and regional computer 620 to be disconnected. Processing of the query is completed.

It will be understood that the foregoing example represents only one possible use of the present invention and that the invention can be applied to any distributed information system application requiring interaction between or among a plurality of remotely located information storage, processing and communication devices. The specific applications of the invention are numerous and include database information services, process control for chemical and mechanical processes, management of the storage, retrieval and transmission of documents, educational instructions, video images (i.e. video tapes), audio messages and music, credit card transaction processing, software distribution, retail store management, shipment and vehicle tracking, reservations, ticket sales and many others.

In summary, the present invention provides a system for managing networked, distributed information systems which greatly increases the efficiency with which information is communicated among or between a plurality of remotely located information storage, processing and management devices, such as computers. The system takes advantage of the capabilities of an Advanced Intelligent Network, such as SS7, by interfacing directly to a service control point of the network. This provides the application manager computer with the ability to configure the network in the most efficient manner to handle the information transfer needs for the particular application.

Although the invention has been disclosed in terms of a preferred embodiment and variations thereof, it will be understood that numerous other variations and modifications could be made thereto without departing from the scope of the invention as defined in the following claims.

What is claimed is:

1. A system for managing networked computer applications comprising:

a) an intelligent telecommunications network including at least one service control point for selectively interconnecting selected ones of a plurality of switching nodes with selected ones of a plurality of transmission links;

b) a plurality of computer systems connected, one each, to different ones of said switching nodes, each said computer system containing information pertaining to an application to be managed; and c) an application manager device for managing said application to be managed, said application manager device including means for instructing said service control point to interconnect selective ones of said plurality of computer systems by selected ones of said transmission links and switching nodes to facilitate efficient processing of said application to be managed.

2. The system of claim 1, wherein said application manager device is connected to said service control point by a communications interface.

3. The system of claim 2, wherein said application manager device further includes means for receiving through said service control point from said plurality of computer systems, information pertaining to said application to be managed.

4. The system of claim 1, wherein said application manager device includes an applications database containing routing algorithm information including bit rate and cost information for each of said transmission links in said telecommunications network, and datastructures pertaining to said application to be managed.

5. The system of claim 4, wherein said application manager device further includes software algorithms which employ said routing algorithm information and datastructures pertaining to said application to be managed for optimizing the execution of said application.

6. The system of claim 1, wherein said plurality of computer systems comprises a plurality of applications computers.

7. The system of claim 1, wherein said application manager device is formed integrally with said service control point.

8. The system of claim 7, wherein said service control point is a computer system and said application manager device is a software module included in said application manager computer system.

9. The system of claim 1, wherein said intelligent telecommunications network is based upon Signalling System 7.

10. The system of claim 1, wherein said networked computer applications are selected from the group comprising database information services applications; chemical and mechanical process applications; document, educational instruction, video image, audio message and music storage, retrieval and transmission applications; credit card transaction processing applications; software distribution applications; retail store management applications; shipment and vehicle tracking applications; reservation processing applications; and ticket sales applications.

11. A method for managing networked computer applications wherein information pertaining to an application to be managed is stored, retrieved and managed by a plurality of applications computers located at sites remote from one another, said method comprising the steps of:

a) connecting each of said applications computers to an intelligent telecommunications network, said network including:
  a plurality of switching nodes, each of said applications computers being connected to a different one of said switching nodes;
  a plurality of transmission links for selectively interconnecting said plurality of switching nodes; and,
  at least one service control point including means for selectively interconnecting selected ones of said nodes with selected ones of said transmission links;

b) determining an interconnection scheme for interconnecting a pair of said plurality of applications computers via a selected one of said transmission links;

c) instructing said service control point to interconnect said pair of applications computers according to said interconnection scheme; and, d) instructing said service control point to send queries and commands to said pair of applications computers to implement said application to be managed.

12. The method of claim 11, wherein the step of determining an interconnection scheme further comprises:

determining a desired transmission link for interconnecting said pair of applications computers, said being determined from routing algorithm information, said information including cost and bit rate information for each said transmission link, and information pertaining to said application to be managed; and, selecting a data transmission bit rate for the determined link.

13. The method of claim 11, wherein said steps of instructing said service control point to interconnect said pair of applications computers and instructing said service control point to send queries and commands to said pair of applications computers further comprises interfacing an application manager device to said service control point and causing said application manager device to send commands to said service control point to interconnect said pair of applications computers, and to send queries and commands to said pair of applications computers to implement said application to be managed.

14. The method of claim 11, wherein said networked computer applications are selected from the group comprising database information services applications; chemical and mechanical process applications; document, educational instruction, video image, audio message and music storage, retrieval and transmission applications; credit card transaction processing applications; software distribution applications; retail store management applications; shipment and vehicle tracking applications; reservation processing applications; and ticket sales applications.

15. A method for managing networked computer applications wherein information pertaining to an application to be managed is stored, retrieved and managed by a plurality of applications computers located at sites remote from one another, and each of said applications computers is connected to an intelligent telecommunications network including at least one service control point for selectively interconnecting said plurality of applications computers through a plurality of transmission links, said method comprising the steps of:

a) providing an application manager device for managing said networked computer applications;

b) causing said application manager device to determine an interconnection scheme for interconnecting a pair of said plurality of applications computers via a selected one of said transmission links; and, c) causing said application manager device to instruct said service control point to interconnect said pair of said plurality of applications computers according to said interconnection scheme.

16. The method of claim 15, wherein the step of determining an interconnection scheme further comprises:

determining a desired transmission link for interconnecting said pair of applications computers, said link being determined from routing algorithm information, said information including cost and bit rate information for each said transmission link, and information pertaining to said application to be managed; and, selecting a data transmission bit rate for the determined link.

17. The method of claim 15, wherein said networked computer applications are selected from the group comprising database information services applications; chemical and mechanical process applications; document, educational instruction, video image, audio message and music storage, retrieval and transmission applications; credit card transaction processing applications; software distribution applications; retail store management applications; shipment and vehicle tracking applications; reservation processing applications; and ticket sales applications.

* * * * *

UNITED STATES PATENT AND TRADEMARK OFFICE
CERTIFICATE OF CORRECTION

PATENT NO. : 5,602,991
DATED : February 11, 1997
INVENTOR(S) : C. Donald Berteau It is certified that error appears in the above-identified patent and that said Letters Patent is hereby corrected as shown below:

On the title page: Item [54]

In the title please delete second occurence of "System for Managing".

In column 1, line 1, delete second occurence of "System for Managing".

Column 6, line 27, change "signal" to --service--.

Column 6, line 45, change "date" to --data--.

Column 6, line 53, change "signal" to --service--.

Signed and Sealed this

Twelfth Day of September, 2000

Attest:

Q. TODD DICKINSON

*Attesting Officer*     *Director of Patents and Trademarks*